United States Patent [19]

Fleming

[11] Patent Number: 4,608,176

[45] Date of Patent: Aug. 26, 1986

[54] REGENERATION OF THIOCYANATE RESINS

[75] Inventor: Christopher A. Fleming, Randburg, South Africa

[73] Assignee: Council for Mineral Technology, Johannesburg, South Africa

[21] Appl. No.: 683,131

[22] Filed: Dec. 18, 1984

[30] Foreign Application Priority Data

Jan. 12, 1984 [ZA] South Africa .................... 84/0244

[51] Int. Cl.$^4$ .............................................. B01J 49/00
[52] U.S. Cl. ................................ 210/677; 75/101 BE;
 210/684; 423/24; 521/26
[58] Field of Search ................... 210/673, 677, 684;
 521/26; 423/24; 75/101 BE

[56] References Cited

U.S. PATENT DOCUMENTS 4,115,260 9/1978 Avery .................................. 210/677
4,372,830 2/1983 Law .................................... 210/684

Primary Examiner—Ivars Cintins
Attorney, Agent, or Firm—Mason, Fenwick & Lawrence

[57] ABSTRACT

A method of regenerating strong-base anion exchange resins which have been used in the extraction of complex anions followed by elution with a thiocyanate strip solution is provided. The method involves the use of ferric ions in a regenerating solution together with a substitute anion for attachment of the resin, the regeneration taking place under conditions in which ferric-thiocyanate complex cations are formed and washed from the resin by the regenerating solution. The thiocyanate can be recovered by neutralizing the regenerating solution to precipitate ferric hydroxide and leave thiocyanate in solution.

12 Claims, 5 Drawing Figures

REGENERATION OF THIOCYANATE RESINS

FIELD OF THE INVENTION

This invention relates to the regeneration of strong-base ion exchange resins after they have been eluted with thiocyanate anions and, in particular, but not exclusively, after the resins have been employed for the extraction of gold (from cyanate or dilute thiocyanate leach solutions) which have been eluted therefrom using thiocyanate solutions.

It must be noted that such strong-base ion exchange resins can be used to adsorb anions which contain metals (such as gold) from thiocyanate leach solutions or liquors and are capable of effective elution from such resins using a thiocyanate stripping solution. The difference between the two thiocyanate solutions is that the one used for leaching has a low thiocyanate content (e.g. about 0.1 Molar) whilst that used for stripping or eluting is substantially stronger (of the order of 0.5 to 3 Molar). The two solutions will be differentiated herein by naming them a "thiocyanate leach solution" and a "thiocyanate strip solution".

BACKGROUND TO THE INVENTION

In many cases where anions are extracted using strong-base resins, difficulty is experienced in eluting the extracted species. A thiocyanate strip solution has been found to be particularly useful for eluting certain extracted species but, unfortunately, the affinity of the strong-base resins for the thiocyanate anion leads to great difficulty in displacing the thiocyanate anion in order to regenerate the strong-base resin.

This leads to two major disadvantages, namely; that the capacity of the anion exchange resin (which is recycled in at least the vast majority of industrial processes) is significantly reduced (as will be seen from the later description herein) and, secondly, thiocyanate is lost and such thiocyanate is a costly reagent.

British Pat. No. 901573 to Davison and entitled "Improvements in or relating to the elution of gold bearing ion-exchange resins" thus proposed a process involving the use of thiocyanate strip solution for recovering gold from ion-exchange resins. The described method involves the use of a mineral acid (preferably sulphuric acid) to strip the thiocyanate from the eluted resin and fresh resin is then used to recover the thiocyanate from the acid liquor.

Applicant has tested this process and found that the efficiency of recovery of the thiocyanate was generally less than about 50% (and that after treatment of the eluted resin with ten times its volume of acid solution), and overall recovery of the thiocyanate from the acid liquor was ultimately less than 40%. Also it was discovered that the ion exchange capacity of the anion-exchange resin was not restored to a satisfactory extent. More satisfactory regeneration was achieved using nitric and hydrochloric acids but, unfortunately, the thiocyanate decomposes fairly rapidly in these solutions to form elemental sulphur.

The object of this invention is, accordingly, to provide a method of regenerating strong-base resins after they have been eluted with thiocyanate strip solutions wherein a satisfactory degree of regeneration is achieved and the thiocyanate is recovered for re-use, as is the resin.

SUMMARY OF THE INVENTION

In accordance with this invention there is provided a method of regenerating a strong-base anion exchange resin after it has been eluted using a thiocyanate strip solution, the method comprising contacting the resin carrying adsorbed thiocyanate with a regenerating solution containing ferric ions and anions suitable for replacing thiocyanate anions in the resin, the contact being carried out under conditions which limit the formation of anionic complexes of ferric and thiocyanate ions, separating the resin and thiocyanate containing regenerating solution, treating such solution with an alkali or base to precipitate iron and separating the iron precipitate from the remaining thiocyanate solution.

Further features of the invention provide for the contacting and separation of the regenerating solution and the resin to be achieved by passing the regenerating solution through a resin bed or, alternatively, by continuous counter current contacting thereof; for the regenerating solution to be a solution of ferric sulphate, ferric chloride, or ferric nitrate; for the concentration of ferric ions in the regenerating solution to be from about 0.035 Molar to 2.0 Molar, preferably 0.5 to 1.0 Molar; for the concentration of thiocyanate in the regenerating solution to be preferably 0.5 to about 1.0 Molar; and for the thiocyanate to be recovered from the regenerating solution by precipitating iron using a solution of calcium hydroxide or carbonate or sodium hydroxide, carbonate, or bicarbonate.

During the recovery of the thiocyanate from the regenerating solution using the alkali, iron precipitates from the solution as ferric hydroxide and, after filtration, a clear thiocyanate solution can be recycled to an eluting stage. For efficient elution, the concentration of thiocyanate in this recycle solution should preferably be about 0.5 to 1.0 Molar. The ferric hydroxide can conveniently be fed to a thickener with the thickener overflow being recycled to the elution step and the thickener underflow being treated with acid (such as sulphuric acid) to reconstitute the ferric ions (sulphate) and the thiocyanate ions. The ferric ions can then be recycled to the regenerating step and any by-product such as gypsum could be removed.

Although this invention is not to be interpreted as being limited, in any way, to any particular process, it is a particular feature of the invention that the regeneration of a thiocyanate eluted resin be linked with an ion exchange extraction process for the recovery of anionic complexes of metal ions from solutions such as gold from cyanide or thiocyanate solutions. This invention therefore is concerned, although not exclusively, with a composite process in which a strong-base ion exchange resin is used for the extraction of gold cyanide or thiocyanate from leach solutions followed by elution of the resin to recover the metal values using a thiocyanate strip solution which in turn is followed by a regeneration step in which the thiocyanate is removed from the resin as defined above.

Various laboratory scale tests have been conducted in order to try out the invention and determine operating conditions of the method and process of the invention. These will now be described and discussed.

DETAILED DESCRIPTION WITH REFERENCE TO THE DRAWINGS

Initial tests established that the thiocyanate concentration in the regenerating solution in contact with a resin being regenerated should be limited failing which anionic ferric thiocyanate complexes form and become adsorbed by the resin thus readsorbing thiocyanate eluted by the ferric solution. This problem is avoided simply by maintaining flow conditions of the regenerating solution relative to the resin such as by passing the solution through a bed (fixed or fluidized) or in a continuous counter-current process.

In order to test the efficiency of the concept of regeneration using ferric ion lots of 200 ml of strong-base resin (A101DU manufactured in the Republic of South Africa by Sentrachem Limited under license to DIA-PROSIM, a French Company) having 21 grams (0.36 moles) of thiocyanate adsorbed thereon, were treated with various different solutions of ferric nitrate. The total amount of ferric nitrate was employed to provide the stoichiometric amount of ferric ions required to remove all of the thiocyanate (i.e. 0.36 moles=20 gFe) and the concentrations of the various ferric nitrate solutions were varied from 2 g/l to 100 g/l.

In each case the quantity of thiocyanate contained in the regenerating solution after contact with the resin was measured and, by difference, the quantity of thiocyanate remaining on the resin was obtained. From these measurements the efficiency of the regeneration was calculated. The results are given below in the table.

| $Fe^{3+}$ g/l | Volume of regenerating solution l | $SCN^-$ in regenerating solution after contact with resin g | $SCN^-$ in regenerating solution after contact with resin M | $SCN^-$ on resin after contact p.p.m. | Regenerating efficiency % |
|---|---|---|---|---|---|
| 0 | 0 | — | — | 250 000 | — |
| 2 | 10 | 20.7 | 0.036 | 9 800 | 96 |
| 4 | 5 | 18.8 | 0.065 | 20 100 | 92 |
| 8 | 2.5 | 18.2 | 0.11 | 20 500 | 92 |
| 20 | 1.0 | 20.1 | 0.35 | 22 800 | 91 |
| 40 | 0.5 | 18.3 | 0.63 | 26 100 | 90 |
| 100 | 0.2 | 13.0 | 1.12 | 36 250 | 86 |

It will be noted that at concentrations of ferric ions up to 40 g/l the efficiency of regeneration was very good (i.e. greater than 90%). At the 100 g/l ferric ion concentration the efficiency decreased to 86%, and this was probably due to poor mass transfer in the extremely viscous solution.

Figure 1:
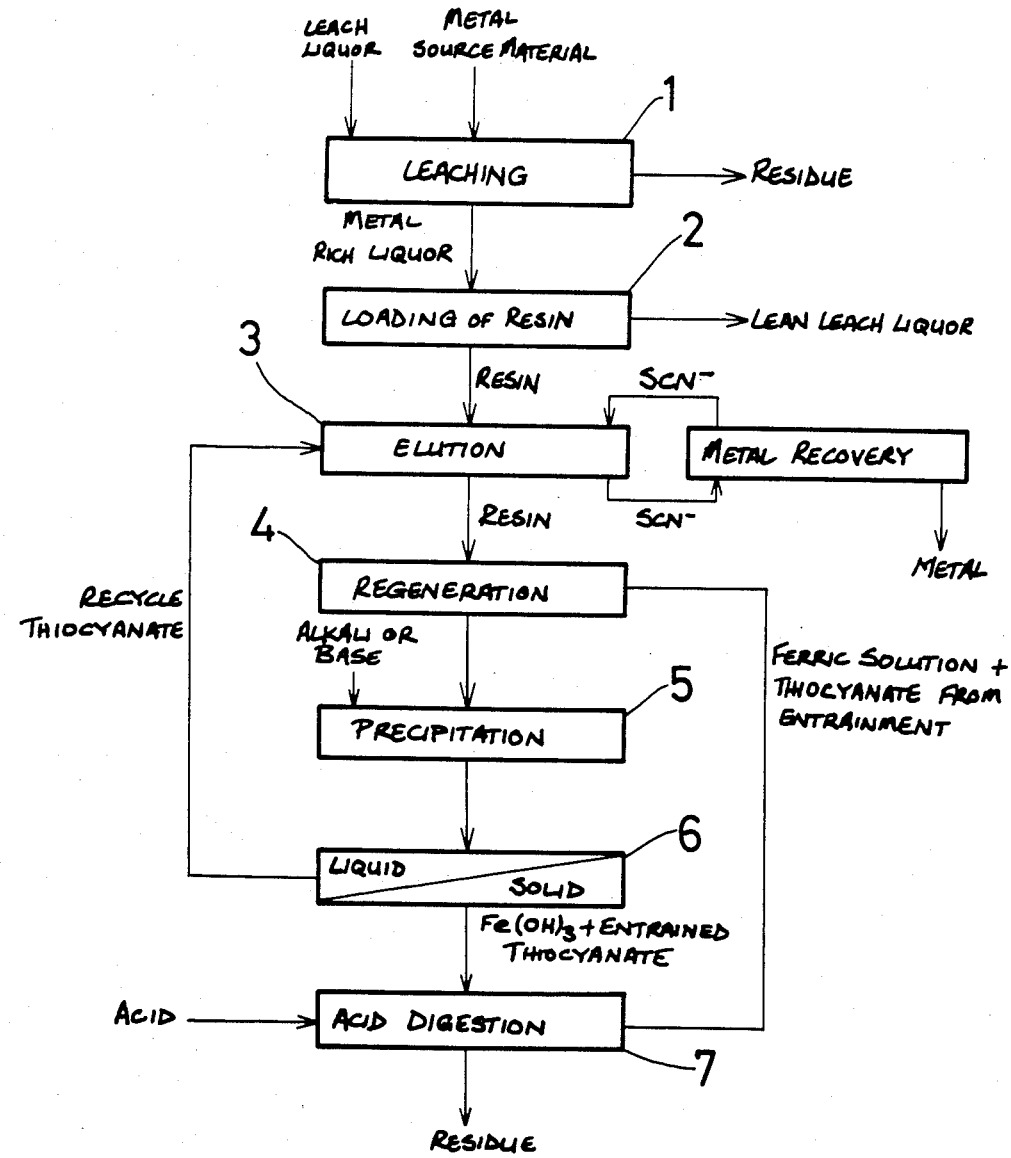
FIG. 1 is a flowsheet for the elution of loaded resin with thiocyanate followed by its regeneration using ferric ions.

The method of this invention is thus illustrated in the flowsheet of FIG. 1 in which the leaching of a metal source material is also depicted. The resin regeneration method is, of course, not limited to use in conjunction with a leaching stage or indeed a loading stage and it could be applied to poisoned resins which are being stockpiled.

The basic process as illustrated in FIG. 1, thus involves the leaching of a metal source material such as an ore, matte or other concentrate at stage 1 followed by loading of the dissolved metal values onto a strong base anion exchange resin at stage 2.

The loaded resin is then eluted using a thiocyanate strip solution at an elution stage 3. The metal values are recovered from the eluate such as by electrowinning, and the thiocyanate recycled.

The thiocyanate loaded resin is then treated with ferric ions in a regeneration stage 4 and these ferric ions are preferably recycled from earlier treatments in substantially similar manner.

The ferric/thiocyanate eluate is then subjected to precipitation of the ferric ion by the addition of alkali or base at a precipitation stage 5. Liquid/solid separation follows at stage 6 and the recycled thiocyanate is returned to the elution stage 3.

Because of the nature of ferric hydroxide, an appreciable amount of thiocyanate solution will generally be entrained with it and is treated at stage 6 to free the entrained liquids and recycle them to the regeneration stage. This expedient avoids the loss of entrained thiocyanate. Such treatment can conveniently be carried out in a thickener whereof the overflow is recycled to the elution stage. The underflow from the thickener is fed to stage 7 where it is treated with acid to reconstitute the ferric regeneration solution and to precipitate an appropriate by-product such as gypsum where lime is used as the neutralizing agent and sulphuric acid for reconstituting the ferric ions.

Figure 2:
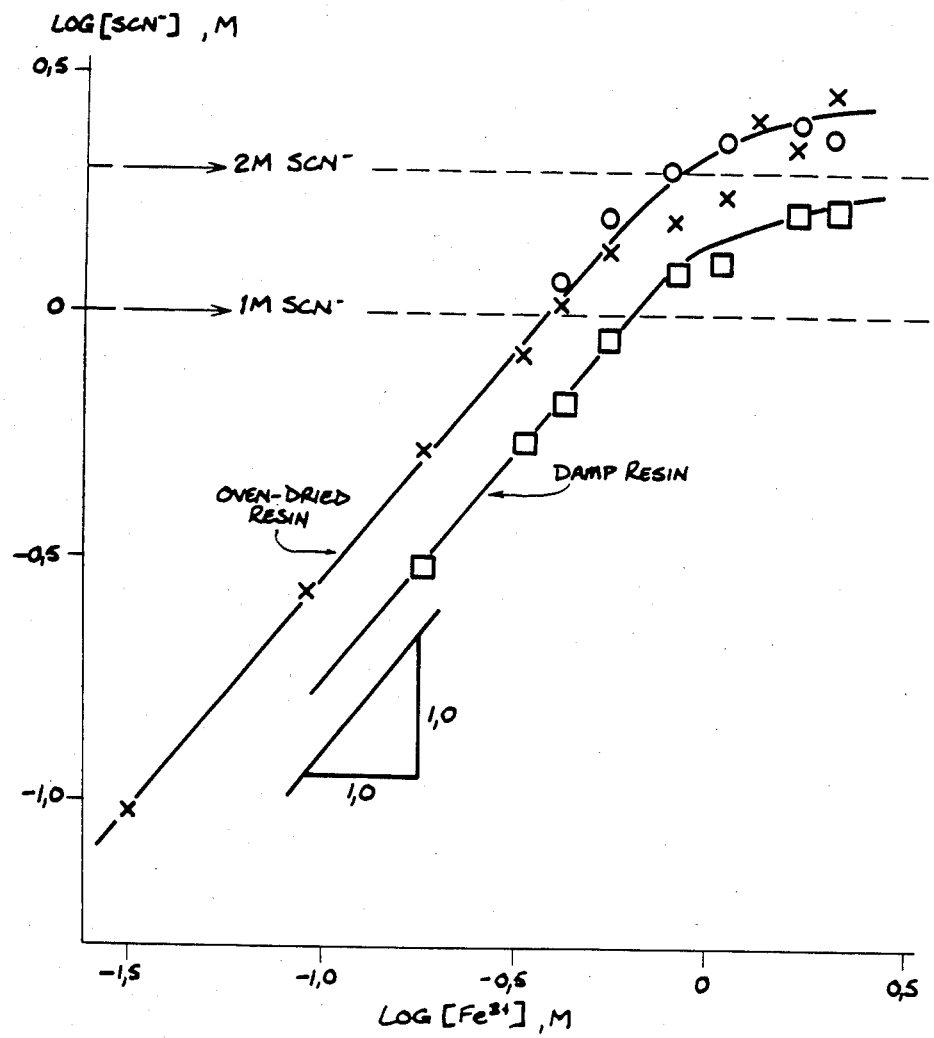
FIG. 2 is a graph illustrating the relationship between ferric ion (as nitrate) concentration and concentration of thiocyanate stripped from the resin in the regeneration stage.

Elution at stage 3 can be achieved with any suitable thiocyanate strip solution. Such solution may have a concentration from 0.2 Molar to 2 Molar thiocyanate and preferably of the order of 1 Molar. In order to regenerate an adequately strong solution for recycling, the ferric ion concentration, in the regeneration stage must be sufficiently high. Tests were thus done to indicate the ferric ion concentrations required. To this end, a range of ferric nitrate solutions between 0.035 and 2.0 Molar were used. To simulate a counter-current process, the ferric solutions were passed through a column containing a large excess of resin ($SCN^->>Fe^{3-}$), and the thiocyanate concentration in the solution emerging from the column was relatively constant for the first few bed volumes. This constant value of the thiocyanate concentration is plotted as a function of the concentration of ferric ions in the regenerant solution in FIG. 2. Included in FIG. 2 are data for two resins with different thiocyanate concentrations (14 and 22 percent by weight indicated by X's and □'s or ⊙'s respectively) and also resins which were either oven-dried before regeneration or treated in a damp state. The results suggest that the concentration of $SCN^-$ on the resin does not influence the concentration of $SCN^-$ in the spent regenerant (provided total $SCN^->>Fe^{3+}$). Moreover, the concentration of thiocyanate in the spent regeneration solution can be increased by 20 to 30 percent by drying the resin prior to regeneration. However, this is not likely to be a practical alternative and the results for the damp resin would probably be the most realistic for an operating situation. Based on these results, a thiocyanate concentration of greater than 1 Molar would be achieved with ferric concentrations of greater than 0.5 Molar in the regeneration solution.

Figure 3:
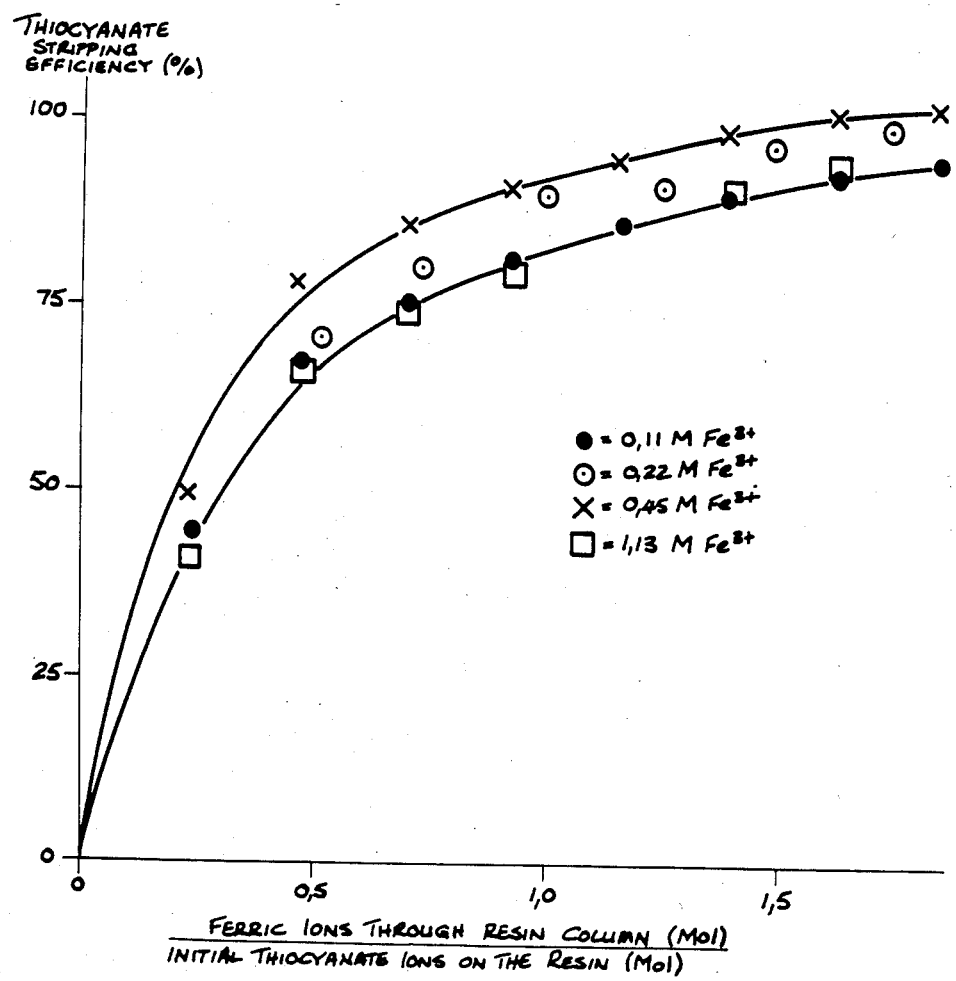
FIG. 3 is a graph illustrating the quantity of ferric ions (as nitrate) required to achieve different degrees of regeneration of a thiocyanate resin.

The actual quantity of ferric ions relative to thiocyanate was also investigated. The quantity of ferric ions required for a specific regeneration duty is difficult to estimate because a number of ferric thiocyanate complexes—the relative proportions of which are difficult to calculate—exist under a given set of conditions. To determine the quantity experimentally, a large excess of ferric nitrate solution ($Fe^{3+} >> SCN^-$) was pumped through a column containing thiocyanate-loaded resin. The solution emerging from the column was collected in increments and analysed for thiocyanate to determine the extent of regeneration as a function of the quantity of ferric ions used. The experiment was repeated at four ferric nitrate concentrations in the range 0.1 to 1.1 Molar, and the results are presented in FIG. 3. The results indicate that about 1.5 mol of ferric ions are required for substantially the complete stripping of 1 mol of thiocyanate from the resin, and that the actual concentration of ferric ions in solution (in the range of 0.1 to 1.1 Molar) has little effect on the regeneration efficiency.

Figure 4:
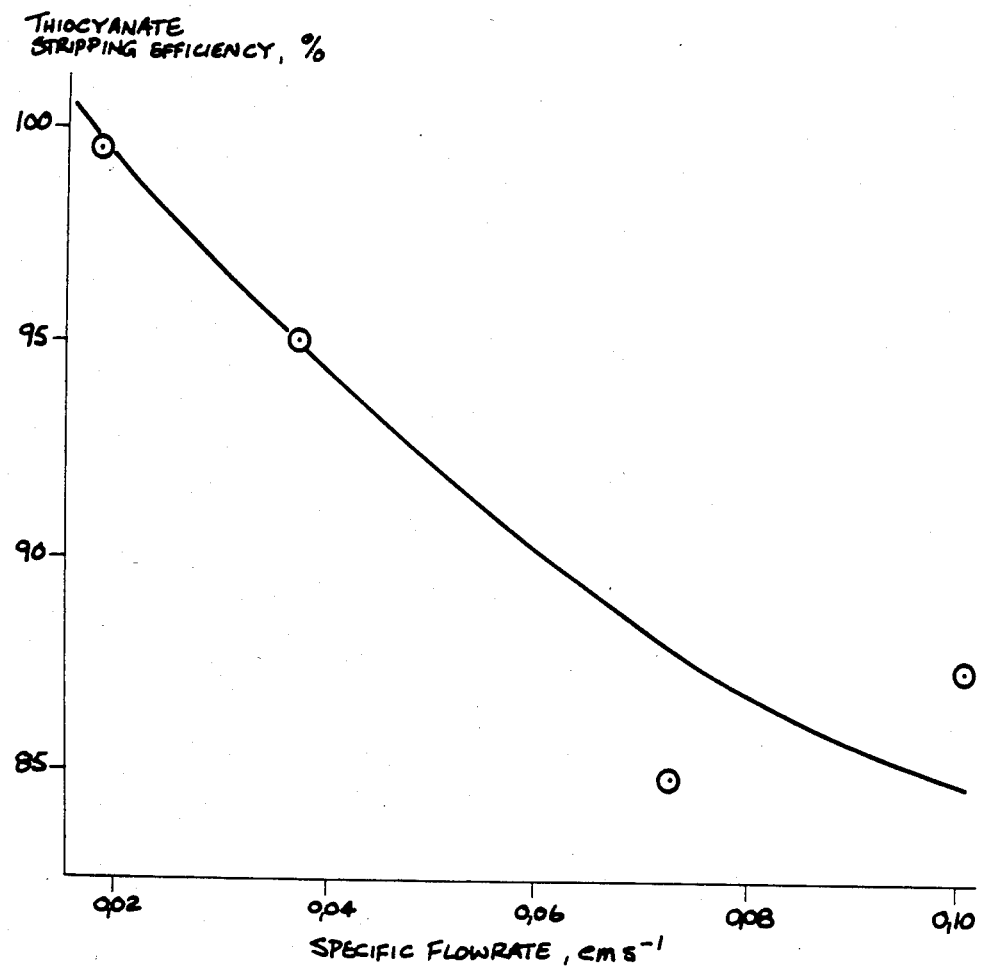
FIG. 4 is a graph illustrating the effect of flow rate of ferric ions on efficiency of regeneration; and, FIG. 5 is a graph illustrating the behaviour of regenerated resin as against fresh resin and one that has not been regenerated.

Another consideration investigated is the effect of flowrate of a given regenerating solution on the regenerating efficiency. The results of the tests are shown in FIG. 4 from which it is clear that greater efficiencies are achieved at slower flowrates. This is probably due to the slow diffusion of the large thiocyanate ions out of the resin matrix. However, it must be borne in mind that the flow should not be so slow that the anionic ferric/thiocyanate complexes form.

In order to test the capacity of resins which have been regenerated using the process of this invention, gold in various different concentrations in cyanide solution was adsorbed onto three different resins. The three resins were a fresh resin (previously unused), a resin which had been regenerated following elution with thiocyanate in accordance with this invention and, a resin which had simply been eluted with thiocyanate but without any regeneration step having been carried out.

Figure 5:
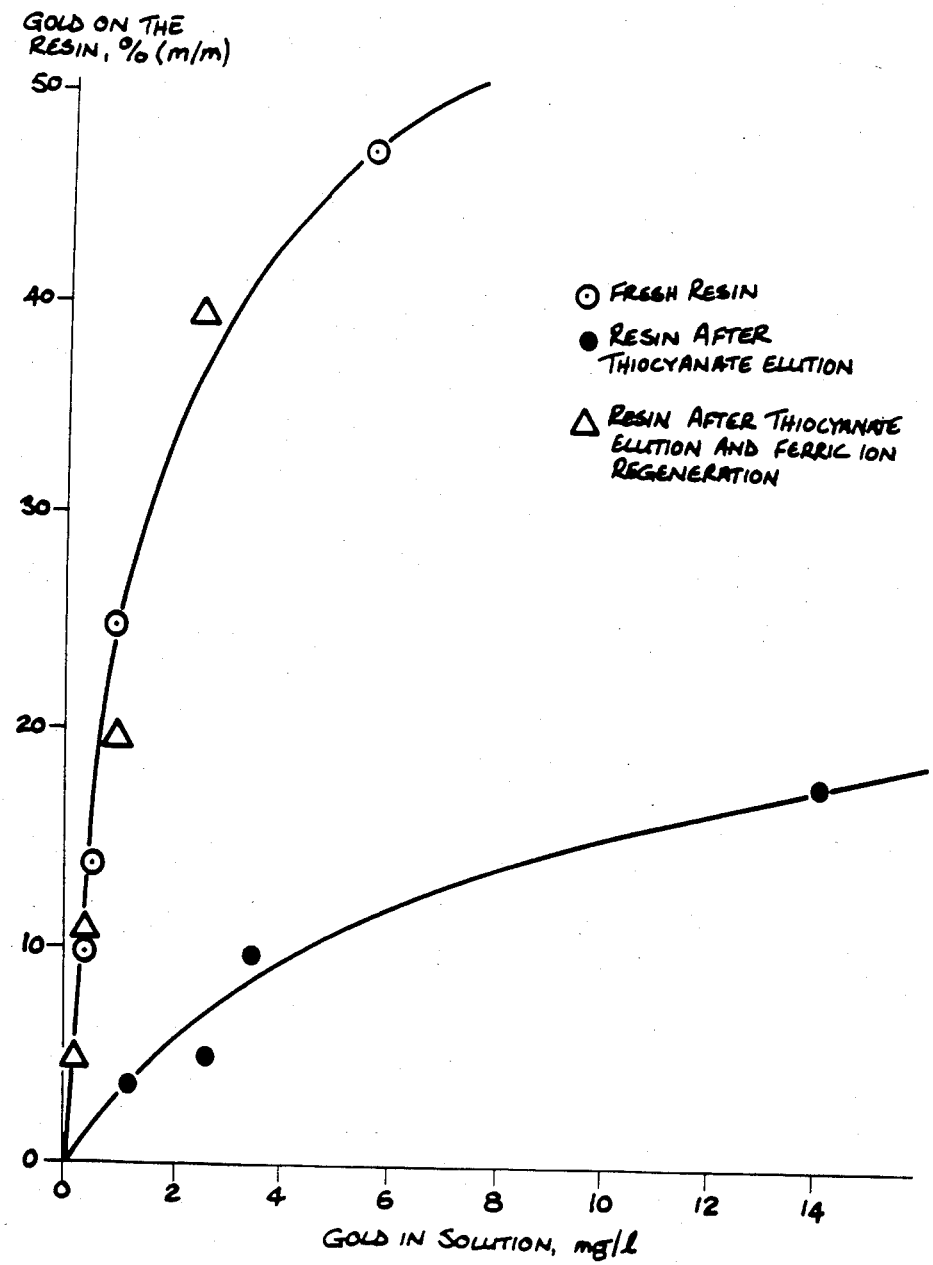

Different quantities of resin (in the range of 0.06 to 2.5 g) were each contacted with 100 ml of solution containing 10 p.p.m. gold (as $KAu(CN)_2$) and brought to equilibrium. The solutions were then analysed for gold and an absorption isotherm was constructed from this data. The experiment was repeated with eluted resin which had not been regenerated, and also with fresh resin for comparative purposes, and the results are presented in FIG. 5. It can be seen that the ion-exchange activity of the resin is significantly reduced after elution of the resin with thiocyanate, but that the ion-exchange capacity is restored substantially to that of a fresh resin after treatment with ferric ions.

Finally the effectiveness of neutralizing agents to recover the thiocyanate and free the ferric ions for re-use was investigated. The results are given in Table 2 for experiments in each of which a 200 ml aliquot of a solution containing 0.45 Molar ammonium thiocyanate and 0.45 Molar of ferric nitrate were titrated to an iron precipitation end-point with various neutralizing agents. The end-point was indicated by the disappearance of the blood-red colouration typical of the ferric thiocyanate complex.

Lime appears to be the preferred neutralizing agent and, when used on a practical scale with ferric sulphate as the regenerant solution, will give rise to gypsum as a by product.

TABLE 2

| Neutralizing agent | Rate of $Fe(OH)_3$ filtration ml/min | Thiocyanate in filtrate M | Thiocyanate lost in filter cake % |
|---|---|---|---|
| $Ca(OH)_2$ | 22 | 0.44 | 2 |
| $NH_4OH$ | 15 | 0.37 | 18 |
| KOH | 13 | 0.40 | 11 |
| NaOH | 12 | 0.43 | 4 |
| $CaCO_3$ | 8 | 0.43 | 4 |
| $(NH_4)_2CO_3$ | 7 | 0.38 | 15 |
| $Na_2CO_3$ | 7 | 0.42 | 7 |
| $K_2CO_3$ | 6 | 0.42 | 7 |
| $NaHCO_3$ | 5 | 0.41 | 9 |

What I claim as new and desire to secure by Letters Patent is:

1. A method of eluting and regenerating a strong-base anion exchange resin comprising the steps of:
   (a) Eluting the resin using a thiocyanate strip solution,
   (b) Contacting the stripped resin which carries adsorbed thiocyanate with a regenerating solution containing ferric ions and anions suitable for replacing thiocyanate anions in the resin, the ferric ion concentration being from about 0.035 to 2.0 Molar, separating the resin and thiocyanate containing regenerating solution, treating such solution with an alkali or base to precipitate iron, and separating the iron precipitate from the remaining thiocyanate solution.

2. A method as claimed in claim 1 in which contacting of the resin carrying adsorbed thiocyanate and the regenerating solution is carried out by passing the regenerating solution through a bed of resin.

3. A method as claimed in claim 1 in which contacting of the resin carrying adsorbed thiocyanate and the regenerating solution is carried out in a continuous counter-current process.

4. A method as claimed in claim 1 in which the regenerating solution is selected from solutions of ferric sulphate, ferric chloride, or ferric nitrate.

5. A method as claimed in claim 1 in which the concentration of the ferric ions in the regenerating solution is from 0.5 to 1.0 Molar.

6. A method as claimed in claim 1 in which the alkali or base is selected from $Ca(OH)_2$, $CaCO_3$, $NaCO_3$, or $NaHCO_3$.

7. A method as claimed in claim 1 in which the iron precipitate is in the form of ferric hydroxide and such precipitate is fed to a thickener with the thickener overflow being recycled to the elution step and the thickener underflow being treated with acid to reconstitute the ferric ions and thiocyanate ions prior to recycling the ferric ions to the regeneration step.

8. A method as claimed in claim 7 and wherein said acid is sulphuric acid and gypsum is produced as a by-product.

9. A method as claimed in claim 1 in which regeneration is continued until the thiocyanate concentration in the spent regenerating solution falls to below 0.2 Molar.

10. A method as claimed in claim 9 in which the regeneration is continued until the thiocyanate concentration in the spent regenerating solution is about 0.1 Molar.

11. A process for the recovery of selected metal values from a leach solution containing such metals in complex anionic form, the process comprising the steps of adsorbing the complex anions on a strong base anion exchange resin, eluting the metal values using a thiocyanate strip solution, regenerating the resin by a process as claimed in claim 1 and recycling the resin to the adsorption stage.

12. A process as claimed in claim 11 in which the selected metal values include gold in the cyanide or thiocyanate complex form.

* * * * *